June 21, 1932.  C. S. McCHESNEY  1,863,757
THICKNESS GAUGE FOR FILM ON CALENDER ROLLS
Filed Jan. 23, 1929  4 Sheets-Sheet 1
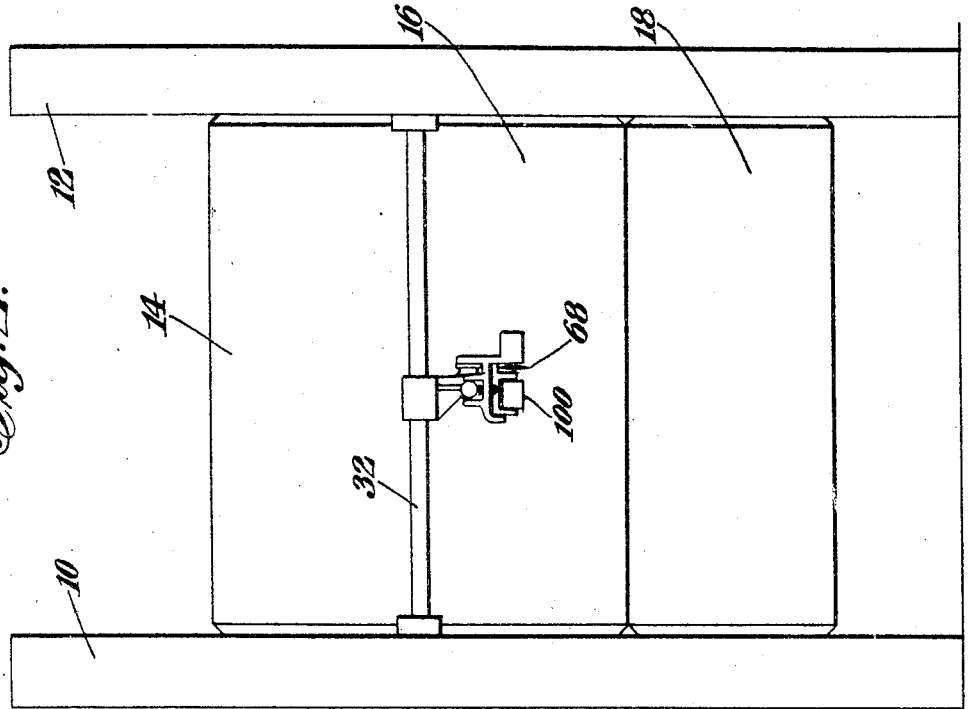
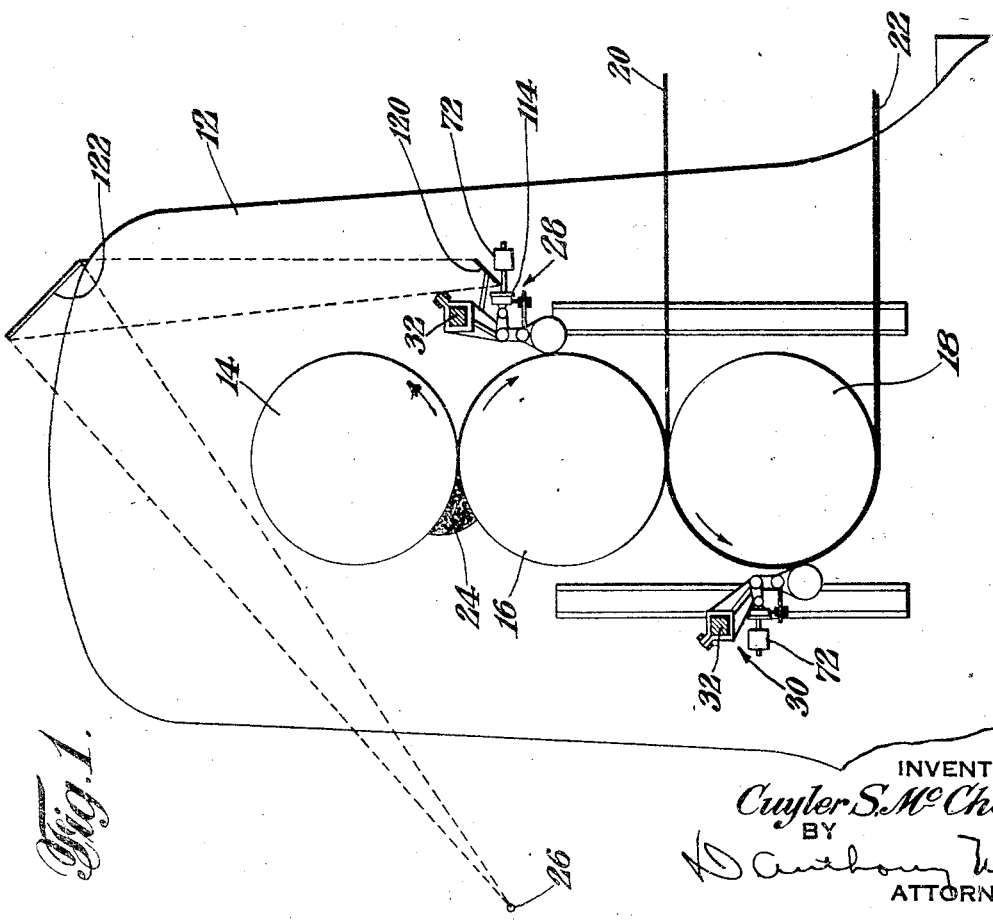
INVENTOR
Cuyler S. McChesney
BY
Anthony Nina
ATTORNEY

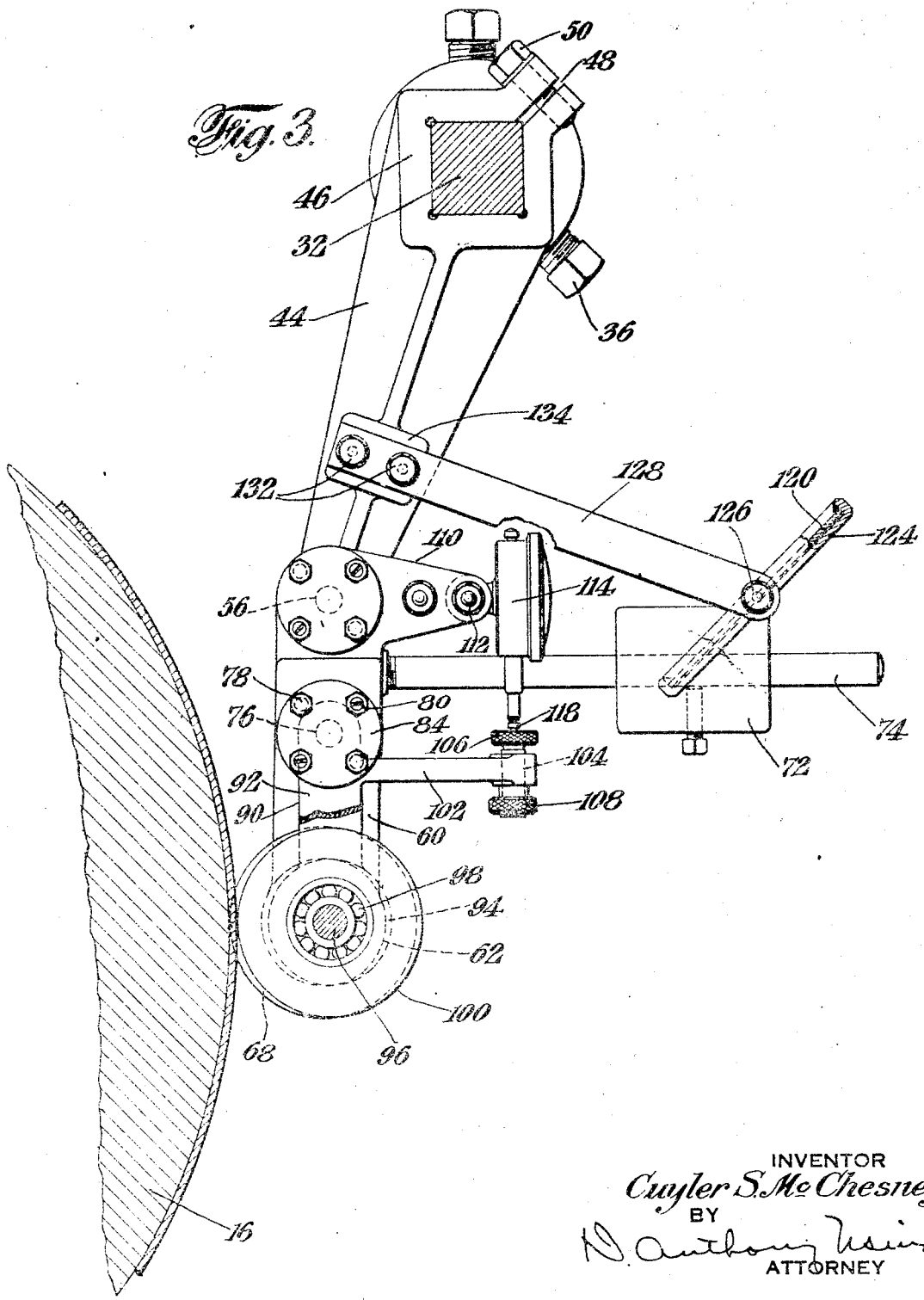

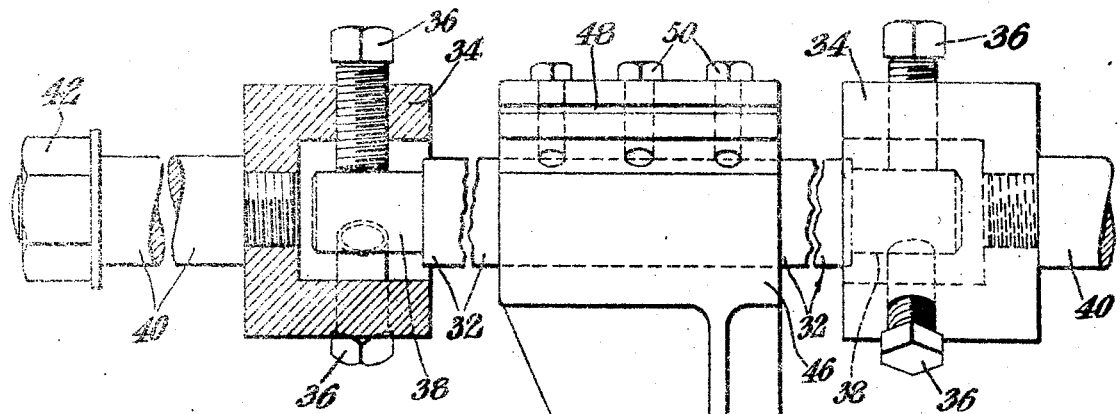
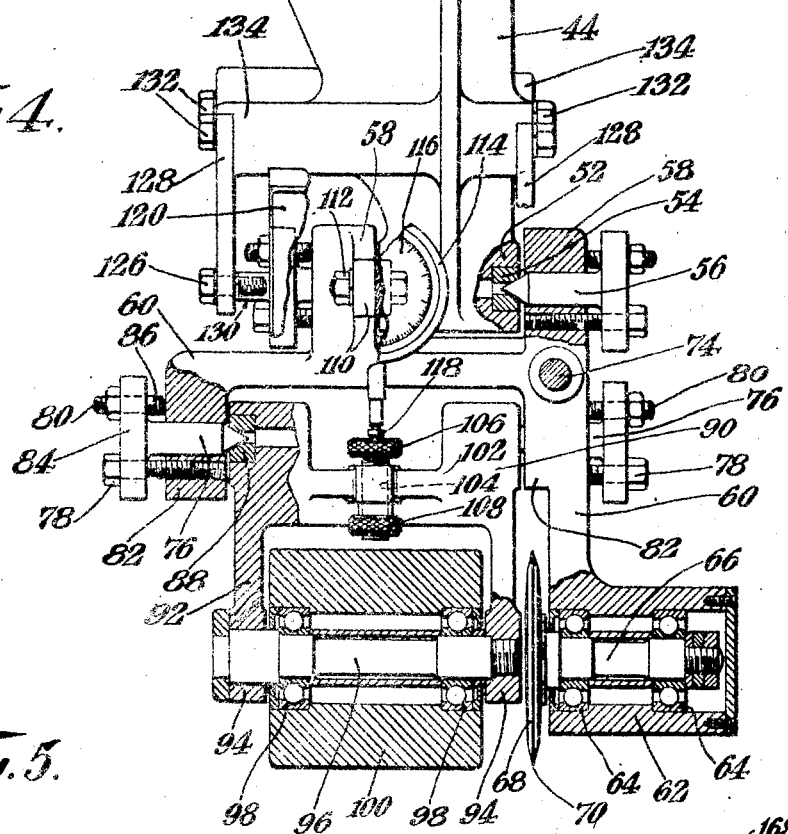
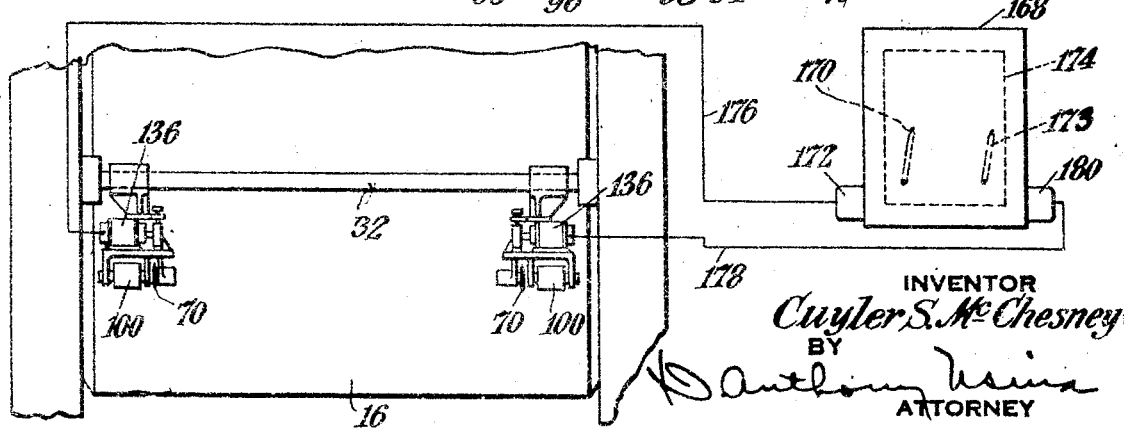

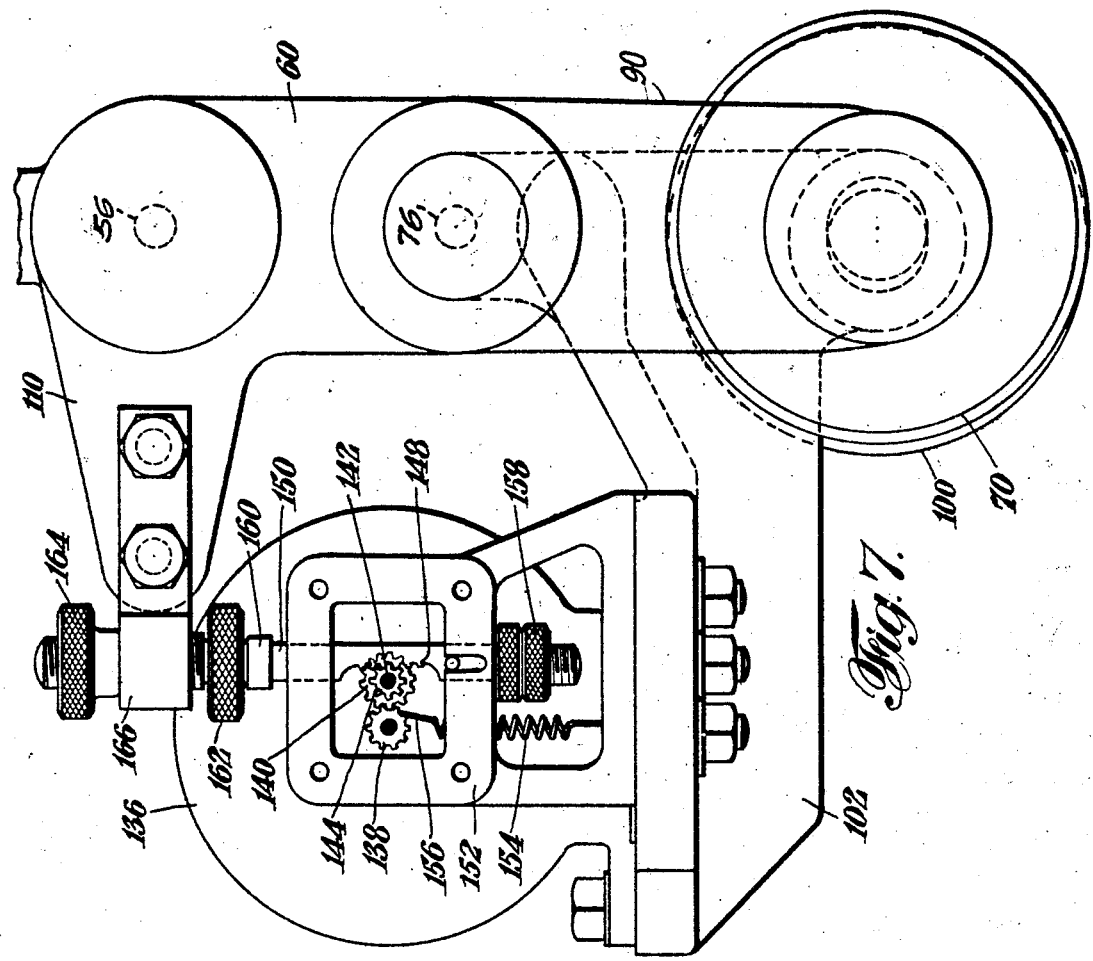

Patented June 21, 1932

1,863,757

UNITED STATES PATENT OFFICE

CUYLER S. McCHESNEY, OF KENMORE, NEW YORK, ASSIGNOR TO DUNLOP TIRE AND RUBBER CORPORATION, OF BUFFALO, NEW YORK, A CORPORATION OF NEW YORK

THICKNESS GAUGE FOR FILM ON CALENDER ROLLS

Application filed January 23, 1929. Serial No. 334,596.

This invention relates to improved means for accurately gauging the thickness of a film of rubber or similar plastic mass traveling over the surface of a calender roll, and aims to provide a precision instrument employing a feeler disc adapted to ride on the surface of the calender roll and a caliper roller mounted for engagement with a film of material being rolled by the calender. In order to gauge the thickness of the rolled film with precision I provide supporting means for the feeler disc and the caliper roll which are so arranged that the feeler disc follows slight inaccuracies in the calender roll, without transmitting such inaccuracies to the indicating instrument. The caliper roll is supported with freedom for movement relatively to the feeler disc and means are provided whereby the amount or magnitude of relative movement between the disc and the caliper roll is visibly indicated by a suitably calibrated gauge and provision is also made for producing a graphic record of the thickness of the film produced by calender rolls. In some instances the indicator gauge is located at a point remote from that at which the material is fed by the operator and I therefore provide a system of mirrors whereby the reading can be readily determined.

The invention will be fully apparent from the following specification when read in connection with the accompanying drawings and the features of novelty will be defined with particularity in the appended claims.

In the drawings Fig. 1 is a somewhat diagrammatic view illustrating a calender having a thickness gauge mechanism combined herewith embodying my invention;

Fig. 2 is a similar diagrammatic view taken at right angles to Fig. 1;

Fig. 3 is an enlarged view showing in detail the arrangement of my improved thickness measuring mechanism and part of the calender roll and film of rubber rolled thereby;

Fig. 4 is a view from the right of Fig. 3 with certain parts broken away and shown in sections in the interest of clearness;

Fig. 5 is a diagrammatic view illustrating the connections between the measuring mechanism and a graphic recording instrument, adapted to make a permanent record of the thickness of the film at opposite ends of one of the calender rolls;

Fig. 6 illustrates a further embodiment of the invention;

Fig. 7 is a detail view from the left side of Fig. 6 with parts shown in section.

Referring in detail to the drawings, 10 and 12 represent the side frames of a conventional form of calender having three calender rolls 14, 16, and 18.

Passing around the lower roll 18 is a band of fabric 20 to which it is desired to apply a film or coating of rubber as indicated at 22. The rubber is fed in lumps or relatively large masses as indicated at 24 by an operator located at the station 26 and the calender rolls 14, 16 and 18 which are driven in the direction indicated by the arrows, roll out the mass of rubber into a thin film the gauge of which is determined by the spacing between the axes of the calender rolls.

In order to avoid waste and enable the production of fabric having a coating of rubber or the like of determined thickness, it is important that the operator be informed at all times as to the thickness of the rubber film traveling over the calender roll 16. For this purpose I provide the improved thickness measuring and indicating mechanism indicated as a whole at 28. In some cases I also provide the mechanism as shown at 30 for indicating the combined thickness of the fabric and the film of rubber applied thereto.

The thickness gauging mechanism is supported from a bar 32 preferably though not necessarily of square cross-section which extends transversely between the side frames 10 and 12, said bar being adjustably supported in blocks 34 each carrying a plurality of screws 36 engaging reduced shanks 38 formed on the extremities of the bar 32. The blocks 34 are carried by posts 40 which are secured to the side frames by means of nuts 42.

A supporting member 44 having a hub 46 which is split at 48 is adapted to be secured in different positions of adjustment along the bar 32 by means of clamping bolts 50. At its lower extremity the member 44 is provided with a hub 52 having bushings 54 therein for engagement with the pointed ends of bearing members 56 which are secured to ears 58 extending upwardly from a bracket 60. At its lower end this bracket is formed with a hub 62 carrying ball bearings 64 which support a spindle 66 which carries a disc 68 having a relatively sharp edge 70 which is adapted to cut through the film of rubber on the calender roll 16 and thus ride on the periphery of said calender roll. For holding and pressing disc 68 against the calender roll I provide an adjustable weight 72 which is slidable on a rod 74 which is threaded in a hub formed on the bracket 60.

This bracket 60 carries pointed bearing members 76 which are adjustably secured thereto by bolts 78 and 80, each bolt 78 engaging a threaded aperture in a hub 82 formed on the bracket 60 and each bolt 80 is threaded through a head 84 secured to the bearing member 76 the end 86 bearing against the outer surface of the hub 82. By turning the bolts 78 and 80 the bearing member 76 can be adjusted inwardly or outwardly.

The pointed ends of the bearing members 76 engage bushings 88 formed in a support 90 having depending arms 92 which at their lower ends have hubs 94 in which are supported a spindle 96 carrying ball bearings 98 for supporting a relatively wide faced caliper roll 100 which is adapted to engage the film of rubber traveling on a calender roll 16 in case of the mechanism indicated as a whole 28. Or, alternatively, in the case of the indicator 30, the roll 100 engages the film of rubber applied to the fabric band 20 traveling over the roll 18.

The supporting member 90 is formed with an outwardly extending arm 102 in the outer end of which is threaded an adjusting screw 104 having a knurled head 106 secured thereto. For locking the adjusting screw in its set position I provide a knurled jam nut 108.

The bracket 60 is formed with an outwardly projecting arm 110 to which is secured by means of a bolt 112, a micrometer thickness gauge or indicator 114 which is calibrated as indicated at 116 to read in standard units. At its lower end the indicator carries a stem 118 which coacts with the upper surface of the head 106 of the screw 104 secured to caliper roll support 90.

With reference to Fig. 1 it is noted that the indicating mechanism 28 is located on the side of the calender roll 16 remote from that on which the operator is stationed. In order to enable the operator to readily determine the thickness of material on the far side of the calender roll I provide mirrors 120 and 122 which are so disposed that the reading of the indicator 114 is reflected to the mirror 120 which in turn reflects it to the mirror 122 located in such relative position with respect to the calender rolls that the operator can readily read the same. The mirror 120 is carried in a frame 124 which is adjustably supported by means of bolts 126 which pass through the free ends of arms 128 and engage threaded holes in hubs 130 formed on the frame 124. The arms 128 are secured by bolts at 132 in grooved bosses 134 formed on the bracket 44.

In the device arranged as above described it is clear that the weight 72 tends to rock the bracket 60 clockwise as viewed in Fig. 3 and thus exerts a force sufficient to enable the disc 68 to cut through the film of rubber on the roll 16 so that the disc will at all times travel on the peripheral surface of the calender roll. Regardless of whether or not the calender roll is slightly out of true the gauge or indicator is responsive to differences in relative movement between the disc 68 and the caliper roll 100, therefore the gauge will give an accurate reading of the thickness of the film.

In some cases it is desirable to measure the thickness of material on opposite sides of the center of one of the calender rolls. It is also advantageous to retain a graphic record of the thickness of material. And to these ends I provide a recording meter which is adapted to make a graph. The recording meter is responsive to relative movement between the bracket 60 and the arm 102 of supporting member 90. This arrangement is illustrated in Figs. 5 and 6. Referring first to Fig. 6 the arm 102 in this case carries a motor 136 to the armature shaft of which is secured a pinion 138 meshing with a gear 140 carried on a stub shaft 142. This shaft also carries a pinion 144 which meshes with rack teeth 148 formed on a vertically slidable rod 150 which is guided in a housing 152 supported by the arm 102. A tension spring 154 has one end secured to the arm 102 and its opposite end 156 is secured to a flexible member which in turn is fastened to the stub shaft 142. The spring tends normally to turn the stub shaft counter clock-wise as viewed in Fig. 7 and thus tends to lift the rod 150. This rod is threaded at this lower end for the reception of adjusting nuts 158 and at its upper end has an enlarged head 160 which bears against the head 162 of an adjusting screw 164 secured to an outwardly extending arm 166 carried by the arm 110 of the bracket 60. As thus arranged it is clear that relative movement between the arm 110 and the arm 102 will cause the rack teeth 102 to transmit movement through the gearing described to the motor 136.

As shown in Fig. 5 on opposite sides of the center of the calender roll 16 I provide separate measuring devices. By providing two such devices, one near each end of the calender roll, I can secure a measurement of the thickness of the film of rubber simultaneously at each end so as to determine whether or not the calender is in proper balance. As shown in Fig. 5, the measuring apparatus is of the kind illustrated in detail in Fig. 6. Obviously I can so locate the measuring instruments illustrated in Figs. 1 to 4 inclusive. However, with the devices of Fig. 6 I can readily secure a record-graph showing the film thickness at opposite ends of the calender roll. As indicated in Fig. 5 I provide for this purpose a double chart recorder 168 having two recording pens 170—173 each adapted to draw a separate graph on a single record sheet 174. The recording pen 170 is actuated by a motor 172 connected to the motor 136 at the left end of the calender roll 16 by means of suitable conductor cable 176. Similarly the motor 136 at the right side of the calender roll is connected by means of a conductor cable 178 with a pen motor 180 adapted to actuate the pen 173. With this arrangement it is clear that a graphic record of the thickness of film at the different parts of the calender roll can be readily secured.

While I have described with great particularity certain specific details of construction of the embodiments of the invention herein illustrated, it is not to be construed that I am limited thereto since various modifications may be made by those skilled in the art without departing from the invention as defined in the appended claims.

What I claim is:—

1. In combination with the rolls of a calender adapted to reduce a plastic mass to a thin film, means for measuring the thickness of the film comprising a disc engaging a roll over which the film travels, a caliper roll engaging the film on said roll near said disc, a pivotally mounted bracket on which said disc is journalled, means tending to hold said disc in contact with said roll, a support for said caliper roll fulcrumed on said bracket and a thickness indicator responsive to relative movement between said disc and said caliper roll.

2. In combination with the rolls of a calender adapted to reduce a plastic mass to a thin film, means for measuring the thickness of the film comprising a disc engaging a roll over which the sheet travels, a caliper roll engaging the film on said roll near said disc, a pivotally mounted bracket on which said disc is journalled, means tending to hold said disc in contact with said roll, a support for said caliper roll fulcrumed on said bracket, an indicator secured to said bracket and means on said fulcrumed support for actuating said indicator on movement of said fulcrumed support relative to the bracket.

3. In combination with the rolls of a calender adapted to reduce a plastic mass to a thin film, means for measuring the thickness of the film comprising a disc engaging a roll over which the film travels, a caliper roll engaging said film near said disc, a pivotally mounted bracket on which said disc is journalled, means tending to hold said disc in contact with said roll, a support for said caliper roll fulcrumed on said bracket and a thickness indicator responsive to relative movement between said disc and said caliper roll, a supporting bar extending lengthwise of the calender rolls and means for adjustably securing said bracket thereto.

4. In combination with the rolls of a calender adapted to reduce a plastic mass to a thin film, means for measuring the thickness of the film comprising a disc engaging a roll, over which the film travels, a bracket journalled for anti-friction pivotal movement on pointed pivot bearings and having a free end upon which said disc is rotatably mounted, means tending to rock the free end of said bracket and the disc toward said roll, a caliper roll and a support therefor which is journalled on anti-friction pointed pivot bearings secured to said bracket and movable towards said first mentioned roll near and in the same direction of movement as, said disc and a thickness indicator responsive to relative movement between said disc and said caliper roll.

In witness whereof, I have hereunto signed my name.

CUYLER S. McCHESNEY.